(12) United States Patent
Pelz et al.

(10) Patent No.: US 11,138,741 B2
(45) Date of Patent: Oct. 5, 2021

(54) SYSTEM AND METHOD FOR EYE TRACKING

(71) Applicants: Jeff B. Pelz, Pittsford, NY (US); Dan Witzner Hansen, Olstykke (DK)

(72) Inventors: Jeff B. Pelz, Pittsford, NY (US); Dan Witzner Hansen, Olstykke (DK)

(73) Assignee: Rochester Institute of Technology, Rochester, NY (US)

( * ) Notice: Subject to any disclaimer, the term of this patent is extended or adjusted under 35 U.S.C. 154(b) by 116 days.

(21) Appl. No.: 16/304,556

(22) PCT Filed: May 26, 2017

(86) PCT No.: PCT/US2017/034756
§ 371 (c)(1),
(2) Date: Nov. 26, 2018

(87) PCT Pub. No.: WO2017/205789
PCT Pub. Date: Nov. 30, 2017

(65) Prior Publication Data
US 2020/0320718 A1 Oct. 8, 2020

Related U.S. Application Data

(60) Provisional application No. 62/342,453, filed on May 27, 2016.

(51) Int. Cl.
*G06T 7/246* (2017.01)
*G06T 7/215* (2017.01)

(52) U.S. Cl.
CPC .............. *G06T 7/246* (2017.01); *G06T 7/215* (2017.01); *G06T 2207/10016* (2013.01); *G06T 2207/30201* (2013.01)

(58) Field of Classification Search
CPC ................. G06T 7/246; G06T 7/215; G06T 2207/30201; G06T 2207/10016
See application file for complete search history.

(56) References Cited

U.S. PATENT DOCUMENTS

| 4,641,349 A | 2/1987 | Flom et al. |
| 5,291,560 A | 3/1994 | Daugman |

(Continued)

FOREIGN PATENT DOCUMENTS

| CN | 103257707 | 8/2013 |
| EP | 3038348 | 6/2016 |

(Continued)

OTHER PUBLICATIONS

Notification of Transmittal of the International Search Report and the Written Opinion, International Search Report, and Written Opinion for PCT Application PCT/US2017/034756; dated Sep. 19, 2017; 11 pages.

*Primary Examiner* — Vikkram Bali
(74) *Attorney, Agent, or Firm* — Bond Schoeneck & King, PLLC; Joseph M. Noto

(57) ABSTRACT

A method and system for monitoring the motion of one or both eyes, includes capturing a sequence of overlapping images of a subject's face including an eye and the corresponding non-eye region; identifying a plurality of keypoints in each image; mapping corresponding keypoints in two or more images of the sequence; assigning the keypoints to the eye and to the corresponding non-eye region; calculating individual velocities of the corresponding keypoints in the eye and the corresponding non-eye region to obtain a distribution of velocities; extracting at least one velocity measured for the eye and at least one velocity measured for the corresponding non-eye region; calculating the eye-in-head velocity for the eye based upon the measured velocity for the eye and the measured velocity for the corresponding (Continued)

non-eye region; and calculating the eye-in-head position based upon the eye-in-head velocity.

1 Claim, 15 Drawing Sheets

(56) References Cited

U.S. PATENT DOCUMENTS

| | | | |
|---|---|---|---|
| 5,410,376 | A | 4/1995 | Cornsweet et al. |
| 6,106,119 | A | 8/2000 | Edwards |
| 6,373,961 | B1 | 4/2002 | Richardson |
| 6,760,467 | B1 | 7/2004 | Min et al. |
| 6,886,137 | B2 | 4/2005 | Peck et al. |
| 7,331,671 | B2 | 2/2008 | Hammoud |
| 7,556,377 | B2 | 7/2009 | Beymer |
| 7,783,077 | B2 | 8/2010 | Miklos et al. |
| 8,064,647 | B2 | 11/2011 | Bazakos et al. |
| 8,744,141 | B2 | 6/2014 | Derakhshani et al. |
| 8,948,467 | B2 | 2/2015 | Bedros et al. |
| 9,092,051 | B2 | 7/2015 | Park et al. |
| 9,189,064 | B2 | 11/2015 | Chaudhri |
| 2004/0233061 | A1 | 11/2004 | Johns |
| 2005/0175218 | A1 | 8/2005 | Vertegaal |
| 2005/0281440 | A1 | 12/2005 | Pemer |
| 2008/0130950 | A1 | 6/2008 | Miklos |
| 2012/0140992 | A1 | 6/2012 | Du et al. |
| 2013/0091515 | A1 | 4/2013 | Sakata et al. |
| 2013/0250087 | A1 | 9/2013 | Smith |
| 2014/0049452 | A1 | 2/2014 | Maltz |
| 2014/0111630 | A1 | 4/2014 | Pires et al. |
| 2014/0320397 | A1 | 10/2014 | Hennessey et al. |
| 2015/0160726 | A1 | 6/2015 | Sullivan |
| 2015/0241967 | A1 | 8/2015 | Saripalle et al. |
| 2016/0166190 | A1* | 6/2016 | Publicover .......... A61B 5/162 351/210 |
| 2017/0045940 | A1 | 2/2017 | Skogo et al. |

FOREIGN PATENT DOCUMENTS

| | | |
|---|---|---|
| WO | 2008030127 | 3/2008 |
| WO | 2015186054 | 12/2015 |
| WO | 2016034021 | 3/2016 |

\* cited by examiner

SYSTEM AND METHOD FOR EYE TRACKING

CROSS REFERENCE

This application claims the benefit of the filing date of U.S. Provisional Patent Application No. 62/342,453 filed May 27, 2016, which is hereby incorporated by reference in its entirety.

FIELD

The disclosure relates to a system and method for eye tracking, and in particular, for monitoring the motion of one or both eyes.

BACKGROUND

Current (image-based) gaze-tracking methods fall into one of two broad categories: feature-based and 3D model-based. In both cases, eye position is determined in each video frame, and velocity signals are derived by differentiating across successive frames. In current feature-based systems, video images are collected of the observers' eye(s) and first-order features are extracted indicating the angular position of the eyes(s) with respect to the camera. Current systems use a number of methods (e.g., thresholding & centroid detection, ellipse fitting) to extract the position of the pupil (the opening in the iris) and the corneal reflection (the first-surface reflection of an illuminator on the cornea, also called the glint, first Purkinje image, CR, etc.). After a calibration procedure in which observers look at known points in space, gaze can be tracked. By tracking both pupil and CR, it is possible to compensate (at least partially) for relative movement between the observer and the camera. In current 3D model-based systems, multiple cameras and/or multiple illuminators produce enough reflection points on the surface of the eye for a 3D model of the eye to be built up over time as successive images are captured (and the eye moves), based on how the reflections move across the 3D surface of the eye. Unlike the feature-based systems, 3D model-based systems can be 'calibration-free' by assuming a fixed offset between the optical axis of the model and the visual axis of the observer.

A disadvantage of current feature-based systems is that they suffer from significant amounts of 'noise' that result from the detection of the pupil and CR positions. Because those first order features are calculated based on relatively few pixels in each frame, even small perturbations of any portion of the image can cause significant errors. The CR is especially susceptible to this effect because it moves a fraction of the distance covered by the pupil during a given eye movement (Li, Munn, & Pelz, 2008), so even a small error in CR placement results in a large artifact in gaze position. Differentiating to get velocity signals then results in apparent amplification of the noise.

The current feature-based systems rely on first-order features and differentiation to get position and velocity with machine-vision based, higher-order feature tracking of multiple points across the field, measuring velocity vectors for each point, and integrating those velocity vectors to achieve position. The method makes use of the small CR to compensate for relative motion of the camera and observer and motion is measured by a reduced gain making the signal susceptible to noise and inaccuracies in a subset of these points.

In existing methods, noise is addressed by temporal smoothing; averaging (or median filtering) over successive video frames. This effectively masks noise, but sacrifices temporal precision and accuracy. The art lacks a method that naturally reduces noise by considering the distribution in the spatial domain, eliminating the temporal losses; with no smoothing required in the temporal domain.

SUMMARY

In accordance with an aspect of the present disclosure, there is provided a method for monitoring the motion of one or both eyes, including: capturing over time a sequence of overlapping images of a subject's face including at least one eye and the at least one eye corresponding non-eye region; identifying a plurality of keypoints in each image of the sequence of images; mapping corresponding keypoints in two or more images of the sequence of images; assigning the keypoints to the at least one eye and to the at least one eye corresponding non-eye region; calculating individual velocities of the corresponding keypoints in the at least one eye and the at least one eye corresponding non-eye region to obtain a distribution of velocities in the at least one eye and the at least one eye corresponding non-eye region; extracting at least one velocity measured for the at least one eye and at least one velocity measured for the at least one eye corresponding non-eye region; calculating the eye-in-head velocity for the at least one eye based upon the measured velocity for the at least one eye and the measured velocity for the at least one eye corresponding non-eye region; and calculating the eye-in-head position based upon the eye-in-head velocity.

In accordance with an aspect of the present disclosure, there is provided a system for monitoring the motion of one or both eyes including a device capable of capturing a sequence of images of one or both eyes and the region surrounding or near the eye(s); a device capable of storing or transmitting the sequence of images; a device capable of performing computations; a device capable of storing or transmitting the results of the computations; and optionally a device capable of visualizing the results of the computations.

These and other aspects of the present disclosure will become apparent upon a review of the following detailed description and the claims appended thereto.

DETAILED DESCRIPTION

Figure 1:
FIG. 1 shows three images from a RGB video sequence in accordance with an embodiment of the present disclosure.

An embodiment of the disclosure includes a method for monitoring the motion of one or both eyes. A sequence of overlapping images of a subject's face which includes at least one eye and the corresponding non-eye region of the at least one eye is captured over time. A sequence of images, either a sequence of still images or a video stream, or a data stream from which a sequence of images can be extracted, are captured over time. At least some of at least one eye, and a corresponding non-eye region are typically visible in each frame. The images may cover a much larger field-of-view, as long as the eye and non-eye regions are contained within the field-of-view. If more than one face is visible within one or more frames, each face can be processed individually. The images can be single-channel (monochromatic) or have a plurality of channels. Single-channel images represent the value of a single variable at each spatial location. Values such as luminance, radiance, or reflectance (each at one or more wavelengths, or over one or more wavelength bands) are typically represented, but other variables/metrics may be represented as well, including but not limited to temperature, polarization state, and distance. If more than one channel is present in the image(s), the sequence of images may contain sequences of multi-channel color images such as RGB, multi-channel color/NIR images such as RGBIR, or other low-channel count systems containing a small number of channels each covering one or more wavelengths, or one or more wavelength bands, or other variables/metrics. Other instantiations may make use of multispectral or hyperspectral image sequences with many image channels, each containing one or more wavelengths, or one or more wavelength bands, or other variables/metrics.

A plurality of keypoints in each image of the sequence of images is identified. Based on features within each image, or between image pairs, a plurality of distinctive features that can be localized in more than one frame (known as 'keypoints') are identified. Keypoints may be identified on one or more channels of multichannel images, or based on data derived from calculations (including, but not limited to, ratios between) between and among multiple channels. Features may include image-based features including, but not limited to, edge, texture, color, and density; and motion features including, but not limited to, velocity and acceleration profiles. In one instantiation, SIFT, SURF, BRISK, ORB, FREAK, or other features extracted from the images are identified using hardware or software. In another example instantiation, features are learned using one of a number of machine-learning approaches, including, but not limited to convolutional neural networks, support vector machines, or reinforcement learning. Such keypoints represent points, collections of points, or regions within each image that have one or more characteristics that can be identified to some degree of confidence in more than one frame. Keypoints can be identified, derived, or calculated based on the values in one or more image channels, and from a spatial location including one or more pixels or locations within an image. Keypoints represent distinctive characteristics in an image that can be localized in one or more other images. Some video compression techniques and algorithms make use of image features, so in another instantiation, those features or combinations of those features are from compressed video files are used.

The corresponding keypoints in two or more images of the sequence of images are mapped. After identifying keypoints in at least two images, potential correspondences between and among those keypoints in at least two images are sought using one or more methods that provide a metric of similarity (or dissimilarity) between and among a plurality of keypoints. Correspondences between keypoints in images represent the distance (in image coordinates) that the image has traveled in the time elapsed between image capture. Among the methods that can be used to establish correspondences between and among keypoints are template matching [Triggs, B. (2004). Detecting keypoints with stable position, orientation, and scale under illumination changes. *Computer vision-ECCV* 2004, 100-113.], and point-to-point matching [Zhao, W., Jiang, Y. G., & Ngo, C. W. (2006, July). Keyframe retrieval by keypoints: Can point-to-point matching help? In *International Conference on Image and Video Retrieval* (pp. 72-81). Springer Berlin Heidelberg.], which are hereby incorporated by reference in their entirety. A commonly used algorithm is provided in the Fast Library for Approximate Nearest Neighbor (FLANN) library [Muja, M., & Lowe, D. G. (2009), Fast approximate nearest neighbors with automatic algorithm configuration. *VISAPP* (1), 2(331-340), 2.], which is hereby incorporated by reference in its entirety. Any method for identifying corresponding keypoints is sufficient. Well-known methods for selecting the best correspondences from among multiple candidate correspondences may also be utilized.

The keypoints are assigned to the eye and to the corresponding non-eye region. Each correspondence represents the offset, in image coordinates, of a point, collection of points, image region, and the like between two or more images. Each offset may have contributions due to motion of the eye within the head ("eye-in-head"), motion of the head with respect to the camera, relative motion of part of the face with respect to the head (e.g., eyelids or eyebrows), among others. The goal of this step is to assign the correspondences identified in the previous step to one of a plurality of categories, including, but not limited to motion of the eye and motion of the head with respect to the camera.

This categorization can be done using one or more characteristics of the images (e.g., single-channel, multiple-channel, or hyper-spectral) such as characterization in one or more color spaces (for example, in one instantiation, the portions of the image and correspondences are categorized as 'eye' if the color of the image regions in RGB, HSV, Lab, or other color space matches that of the iris being tracked, and 'non-eye' if it matches that of the skin color of the observer being tracked). In another instantiation, the distance/motion characteristics of the correspondence can be used for categorization. Any other characteristic that distinguishes the two or more regions can also be used for categorization.

Individual velocities are calculated for the corresponding keypoints in the eye and the corresponding non-eye region to obtain a distribution of velocities in the eye and the corresponding non-eye region. Each correspondence has associated with it a distance; the distance between the two keypoints on the two images. Given the interval between image capture (delta-time), the velocity of each correspondence can be calculated as the ratio of distance and delta-time. All correspondences thus result in velocities, and at least two distributions of velocities are obtained: 1) A distribution of velocities of keypoints within the eye region (for one or more eyes) and, 2) a distribution of velocities of keypoints within the non-eye region (associated with one or more eyes). Other regions may also be used to extract other characteristics, including but not limited to points across the surface of the face to fit a model of the head that can be used to estimate the pose of the head.

Extracted from the distribution of velocities is at least one velocity measured for the eye and at least one velocity measured for the corresponding non-eye region. The distributions of velocities contain information about every keypoint within each category. In addition to the signal of interest, the distribution may contain noise due to random variation, erroneous keypoint matches, and other causes. Other causes of variation may include, but not be limited to, non-rigid deformation of the iris during motion, dilation/constriction of the iris, non-rigid motion of different regions of the face, movement of eyelids, eyelashes, eyebrows, and the like. At least one velocity signal is extracted from the distribution of keypoint velocities related to the eye region for one or both eyes. If a single velocity signal is extracted, it can be a measure of central tendency such as the mean or median of the distribution which provides a signal relatively free from the effects of noise and higher-order effects, or another signal derived from the distribution. If a plurality of signals are extracted, those signals may represent one or more measures of central tendency representing one or more features of the eye (including, but not limited to ocular position, torsion, dilation, constriction, and distortion) and one or more measures of dispersion for those or other measures. Similar measures for each eye can be obtained if more than one eye is tracked, and for non-eye regions of the face.

The eye-in-head velocity is calculated for the eye based upon the measured velocity for the eye and the measured velocity for the corresponding non-eye region. The distributions and measures for eye or eyes and non-eye region(s) represent the motion of the relevant regions. The velocities of the keypoints within the eye region(s) with respect to the non-eye region(s), and the velocities of the eye(s) with respect to the non-eye region(s) can be calculated from the distributions or the measures extracted from the distributions. In one instantiation, such a calculation can be computed as the two-dimensional difference between the eye and non-eye velocities, yielding the eye-in-head velocities. Other methods include identifying a plurality of points on the eye and non-eye regions and calculating homographies of each region to quantify the complex motion of each [Vincent, E., & Laganiére, R. (2001). Detecting planar homographies in an image pair. In *Image and Signal Processing and Analysis, 2001. ISPA 2001. Proceedings of the 2nd International Symposium on* (pp. 182-187). IEEE.]

Other methods include forming three-dimensional models of the face from a plurality of points on the face and of the eye(s) from a plurality of points on each iris, and extracting the angular and positional velocity of the face model, and of the eye model(s), and calculating the relative angular and positional velocity of the eye(s) with respect to the face. Using one of these, or another method, the relative velocity of the eye-in-head can be extracted from the distributions of velocities, resulting in a sequence of velocities of the eye-in-head at each time step represented by each video frame or equivalent derived from a compressed or uncompressed video file.

The eye-in-head position is calculated based upon the eye-in-head velocity. Given the sequence of eye-in-head velocities, and a measured, presumed, or inferred reference point, the eye-in-head position can be calculated by numerically integrating over time. If a uniform time interval elapses between frames, a uniform delta-time can be used in the numerical integration. If the interval between frames is non-uniform, the actual, inferred, or measured delta-time can be used for each integration time step.

An embodiment of the disclosure includes a system for monitoring the motion of one or both eyes. A device for capturing a sequence of images of one or both eyes and the region surrounding or near the eye(s), a method or device for storing or transmitting the sequence of images, a method or device for performing computations, a method or device for storing or transmitting the results of the computations, and optionally a device for visualizing the results of the computations are used in this embodiment. In this example, a digital camera is used to collect a sequence of images of a region of an observer's face including one eye and a non-eye surface from the region surrounding that eye.

FIG. 1 illustrates a subset of three images from an example RGB video sequence showing a sequence of images containing at least one eye and a portion of non-eye surface.

Figure 2:
FIG. 2 illustrates the location of keypoints identified on two single images from a video sequence in accordance with an embodiment of the present disclosure.

FIG. 2 illustrates the location of the keypoints identified on two single images from an example video sequence. In this example, keypoints are identified on grayscale images derived from a multichannel image to enhance the identification of keypoints within the iris region. In this example, the two images are adjacent in the video sequence, but in other instantiations, keypoints in images more distant in time are identified.

Figure 3:
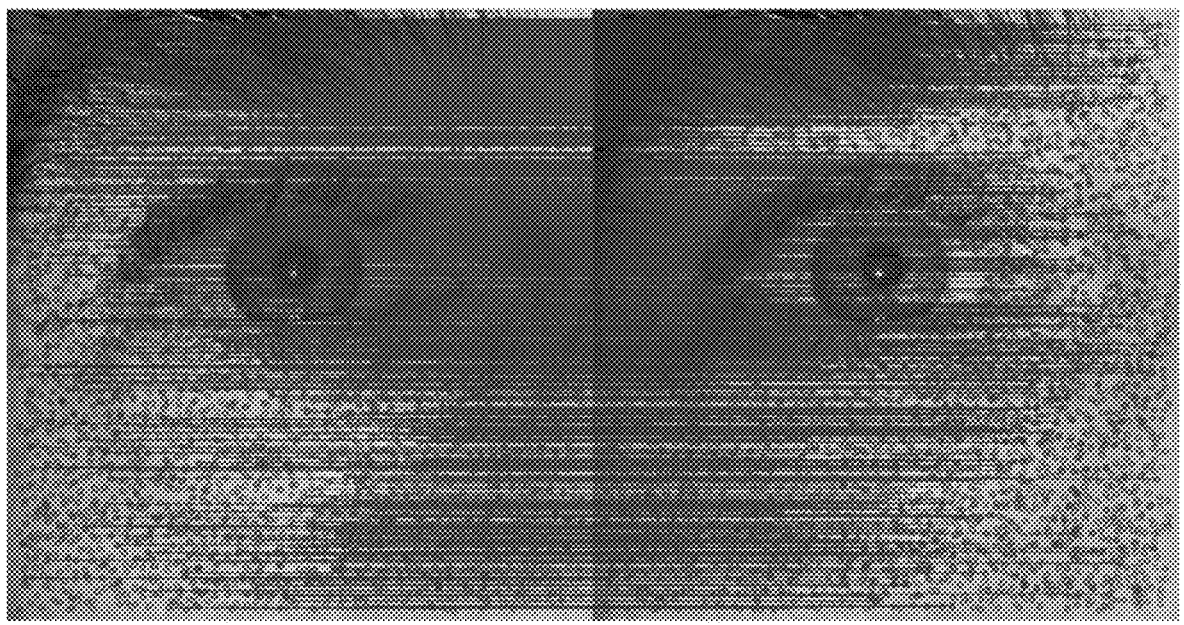
FIG. 3 illustrates corresponding keypoints identified in two image frames from a video sequence in accordance with an embodiment of the present disclosure.

FIG. 3 illustrates corresponding keypoints identified in two image frames. In this example, the frames are adjacent in the image sequence. The lines connecting keypoints in the adjacent frames serve to illustrate 'pairs' of corresponding keypoints that have been identified in the two frames. Because the frames are adjacent in time, the corresponding keypoints have moved only small distances, so the connecting lines appear nearly "horizontal," indicating very little vertical motion of the keypoints between frames visible in the rendering at this scale.

Figure 4:
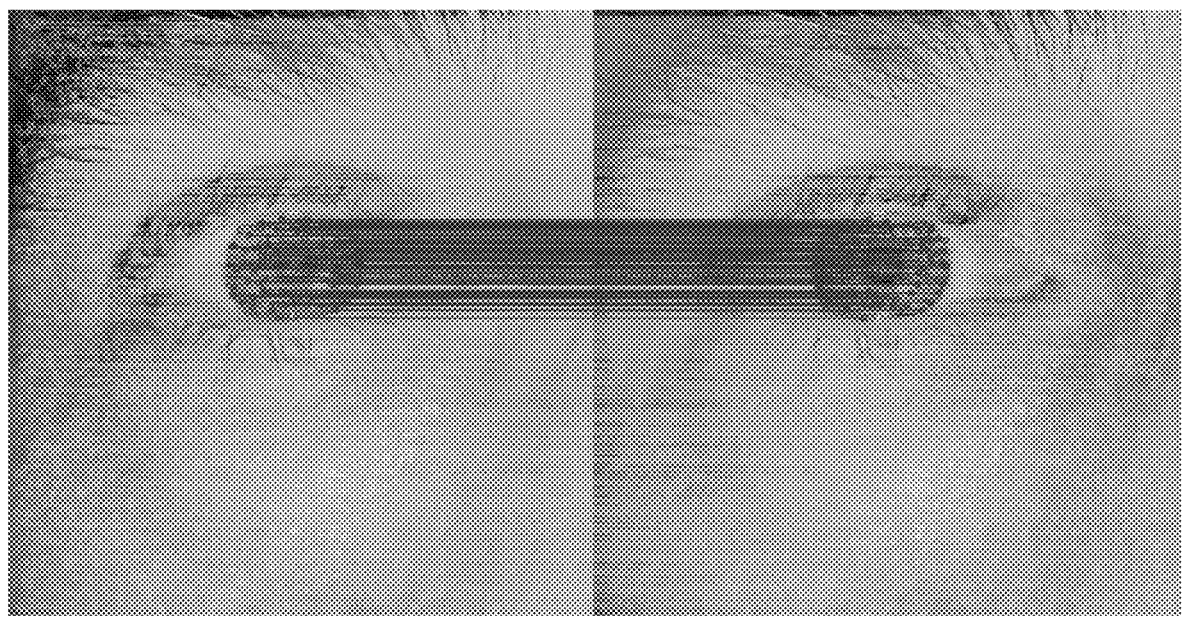
FIG. 4 illustrates keypoints assigned to the eye region in the two images and the lines indicating the correspondences between the keypoints shown in red.

FIG. 4 illustrates a plurality of keypoints assigned to the eye regions in the two frames in this example, and to the correspondence assigned to a subset of those keypoints identified as matching between the two images. Shown in red (darker) in FIG. 4, the keypoints assigned to the eye region in the two images and the lines indicating the correspondences between the keypoints, illustrate the small motion that has occurred in the time interval between the two image capture events. In this example, the keypoints assigned to the eye region were selected based on the color characteristics of the surrounding regions. Specifically, in this example, the RGB image was transformed to the CIE Lab color space, and a sub-volume within that color space was specified that was more likely to contain the iris region. In this example, a mask was formed based on the CIE Lab color space sub-volume for each image, and keypoints within the masked region in each image were assigned to the eye region. In FIG. 4, the lighter keypoints illustrate locations of features or sets of features identified in non-eye regions, and the lighter lines connecting a subset of those keypoints indicate correspondences between non-eye keypoints. In this instantiation, all keypoints not assigned to the eye region are assigned to the non-eye region.

Figure 5:
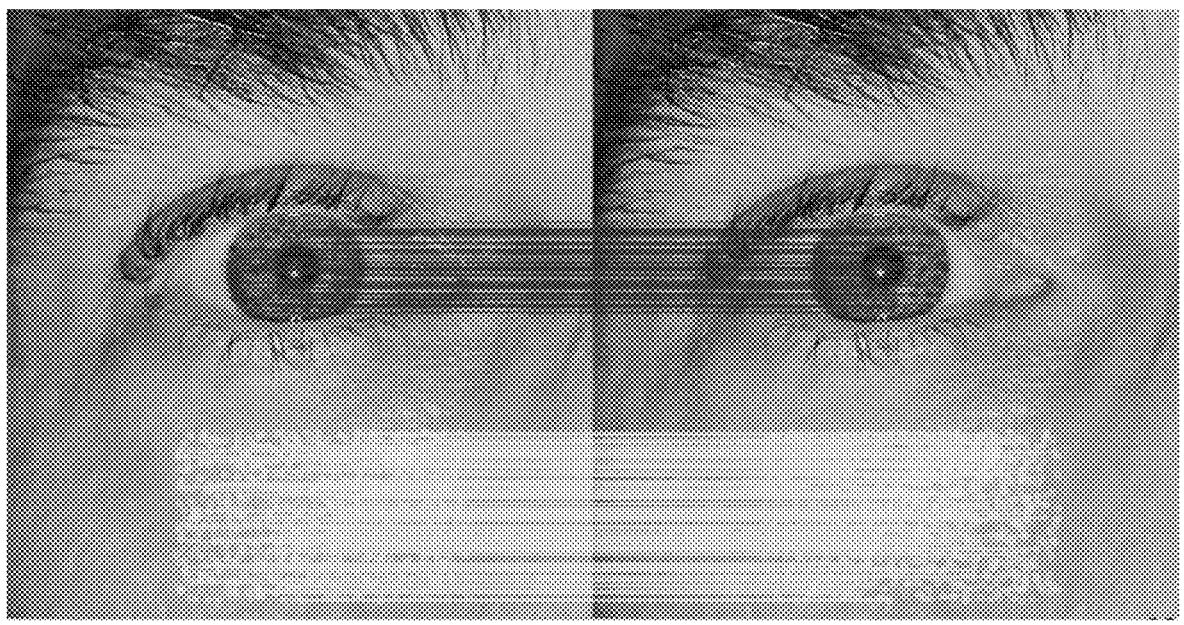
FIG. 5 illustrates corresponding keypoints assigned to the eye region shown in red and corresponding keypoints assigned to the non-eye region shown in yellow.

FIG. 5 illustrates an alternate instantiation in which the non-eye region is limited to a subset of the face region. In FIG. 5, the red keypoints illustrate keypoints assigned to the eye regions in the two frames, and the lines indicate the correspondences between the keypoints. A rectangular region below the eye region has been specified in pixel coordinates to serve as the non-eye region, and keypoints are illustrated in yellow in the two images and correspondences between keypoints are shown as lines connecting corresponding keypoints. While the non-eye region has been specified in pixel coordinates in this example, it could be specified in any manner. Other methods for assigning keypoints to the non-eye region may be used, including, but not limited to, specifying color-space sub-volumes, motion characteristics, and spatial maps.

Figure 6:
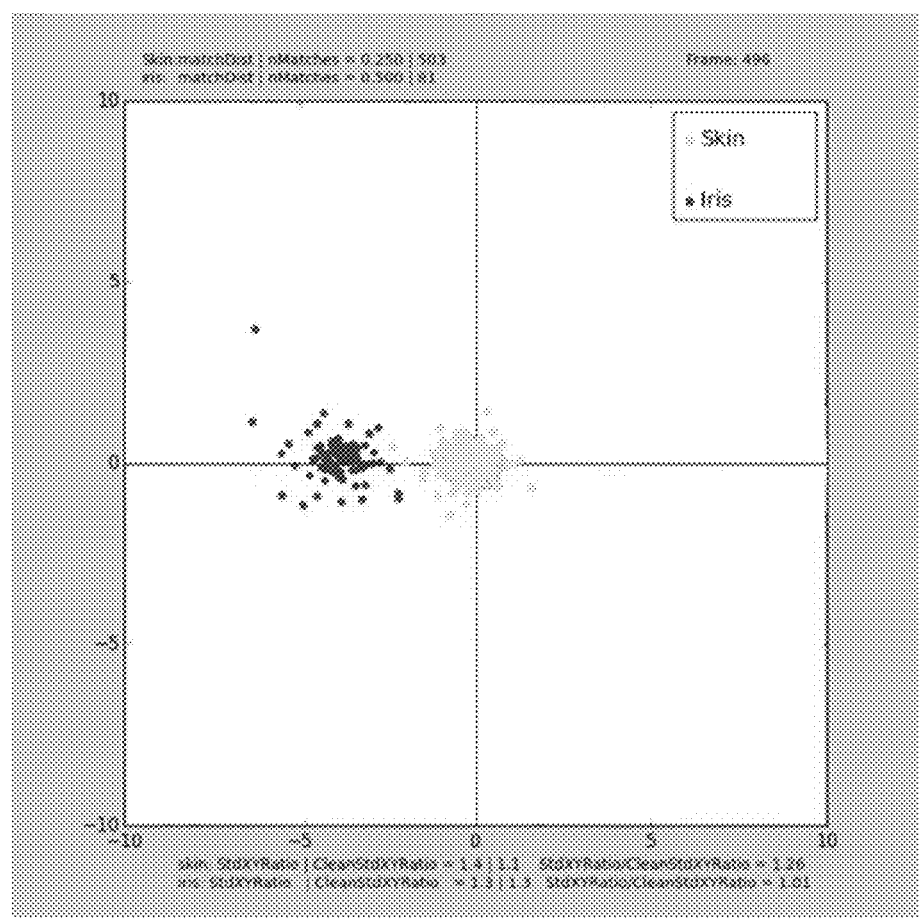
FIG. 6 illustrates a plot of distribution of velocities calculated from corresponding keypoints in eye regions shown as scatterplot of red points and corresponding keypoints in non-eye regions shown as scatterplot of yellow points.

FIG. 6 illustrates the distributions of velocities calculated for the set of correlated keypoints assigned to eye regions and non-eye regions. The velocities are visualized in one display method; a two-dimensional plot, where the horizontal and vertical velocities of each corresponding pair are indicated by the position in the scatterplot. The category of assignment (eye vs. non-eye in this example, but in other instantiations eye 1, eye 2, etc., non-eye 1, non-eye 2, etc.) is indicated by the color of the point in the scatter plot. The central tendency of each category is evident in FIG. 6, as is the dispersion within each category.

Figure 7:
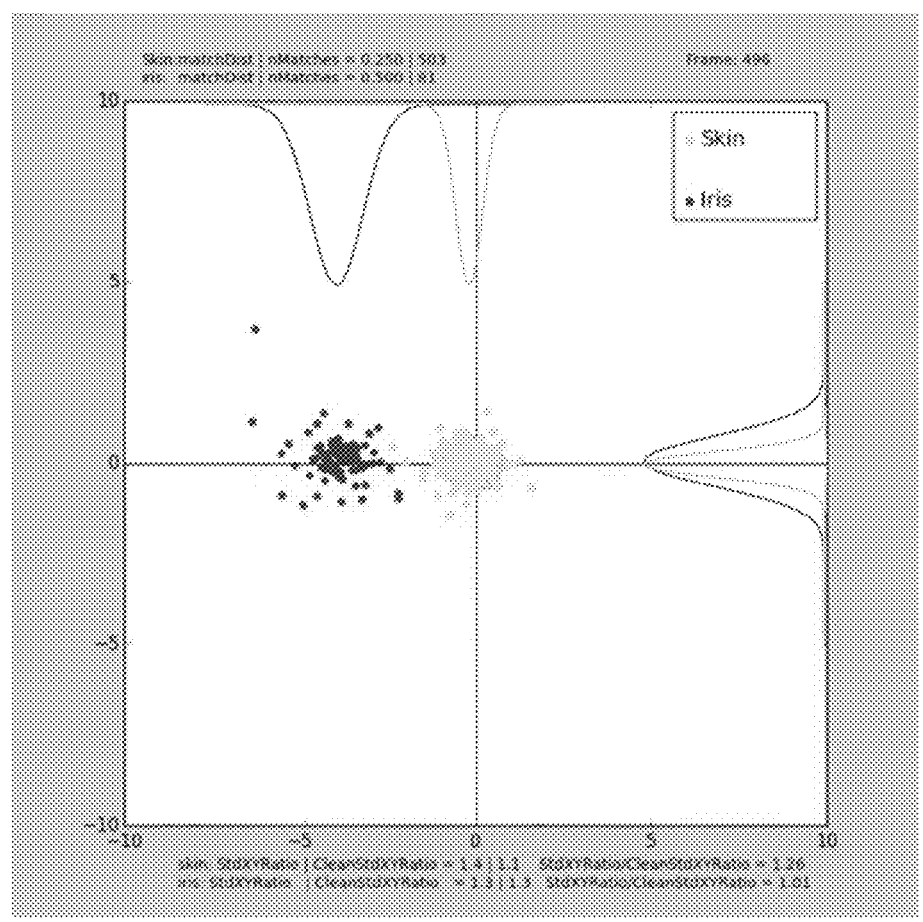
FIG. 7 illustrates a plot of distribution of velocities in each category (labeled 'Iris' and 'Skin') represented by best-fit Gaussian functions in the horizontal and vertical dimensions.

One example method for characterizing the distribution within each category is to fit a model function to the data. In the example illustrated in FIG. 7, two one-dimensional Gaussian distributions are fit to each of the eye and non-eye categories. In this example, each distribution is characterized by four variables; the mean and variance in the horizontal and vertical dimensions. Other model fits include, but are not limited to, parametric and non-parametric functions, mixture-models, and custom models derived from machine-learning techniques. The full distributions, or any characterization of the distributions may be used to contain or convey information about the velocities of the eye and the non-eye regions. In the example shown, it is evident in FIG. 6 and FIG. 7 that the eye region is in motion, and despite the fact that the individual offsets are very small in the short interval between frames, there is a clear velocity signal as the eye image shifts between frames.

Figure 8:
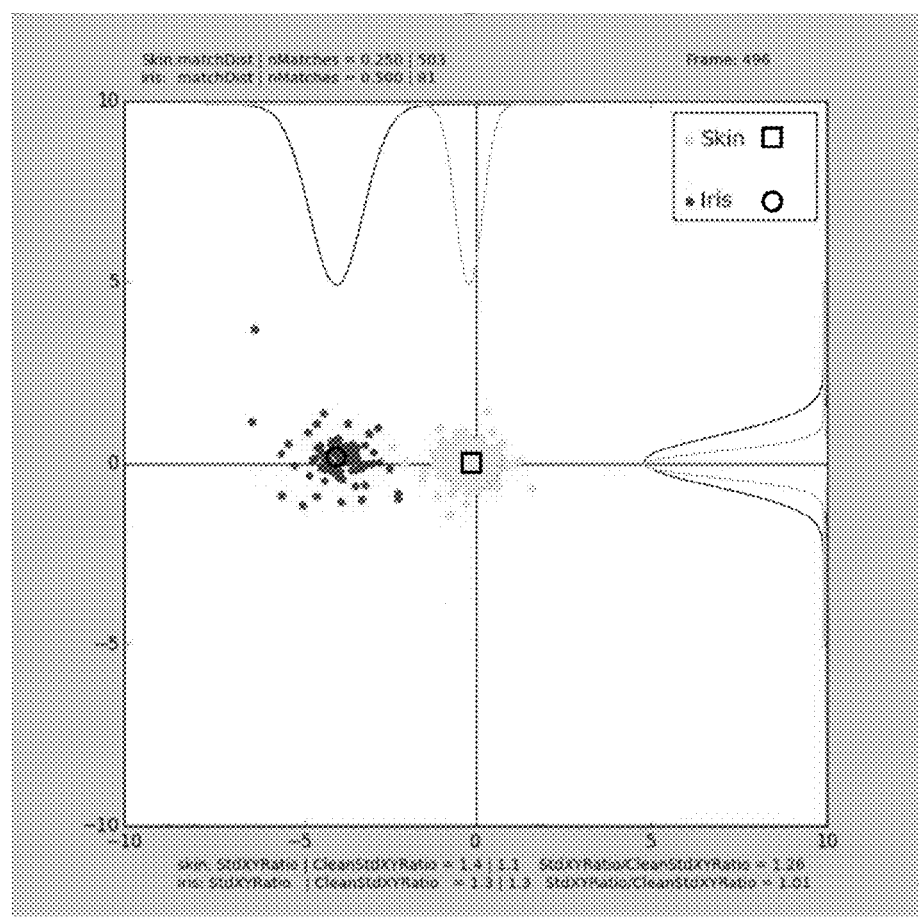
FIG. 8 illustrates a plot of the geometric median of each velocity distribution superimposed over the eye and non-eye region distributions, the geometric median of the eye region indicated with a circle symbol and the geometric median of the non-eye region indicated by a square symbol.

FIG. 8 illustrates another method of extracting a compact representation from the distributions. In the example shown, the geometric median is computed from each distribution as a noise-resistant metric of central tendency. In other instantiations, two one-dimensional metrics can be computed for each distribution, or one of any other metric capable of representing the central tendency, dispersion, and/or higher order characteristics of the distribution may be computed. The geometric median of each velocity distribution is indicated superimposed over the eye and non-eye region distributions. The geometric median of the eye region is indicated with a circle symbol; the geometric median of the non-eye region is indicated by a square symbol.

Figure 9:
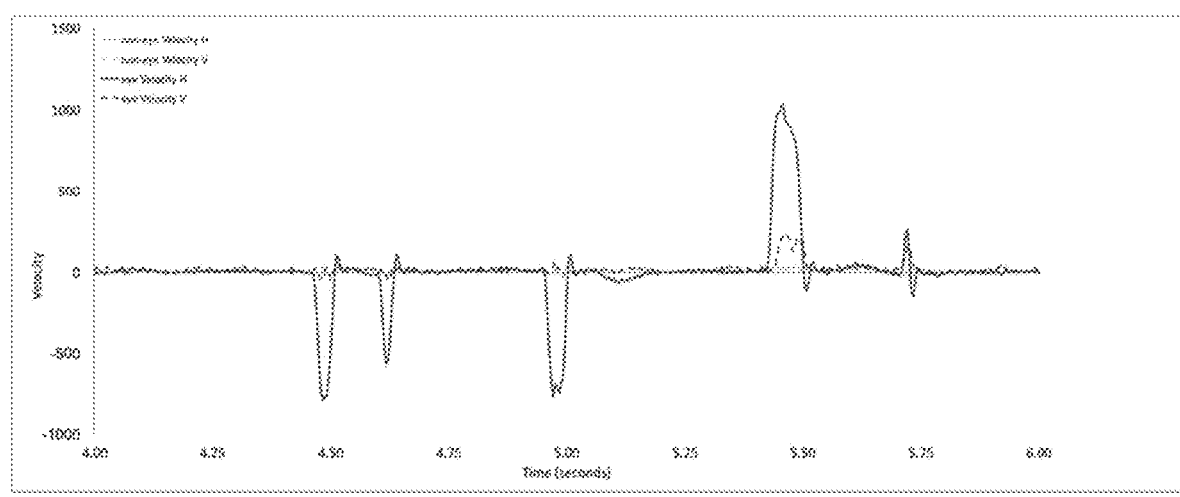
FIG. 9 illustrates velocity signals over a two-second time period, wherein horizontal (solid lines) and vertical (dashed lines) velocities for the eye regions (red lines) and non-eye regions (yellow lines) are shown as the eye makes four relatively large eye movements, and one miniature eye movement.

FIG. 9 illustrates the velocity signals of the eye and non-eye regions over a two-second time period. Horizontal and vertical components for each are plotted as a function of time. Horizontal (solid lines) and vertical (dashed lines) velocities for the eye regions (red lines) and non-eye regions (yellow lines) are shown as the eye makes four relatively large eye movements, and one miniature eye movement. Four large eye movements are obvious, as is a miniature "microsaccade" that occurs at approximately 5.75 seconds. While not evident at this scale, there is also a nearly constant velocity in both horizontal and vertical directions between the camera and the non-eye regions.

Figure 10:
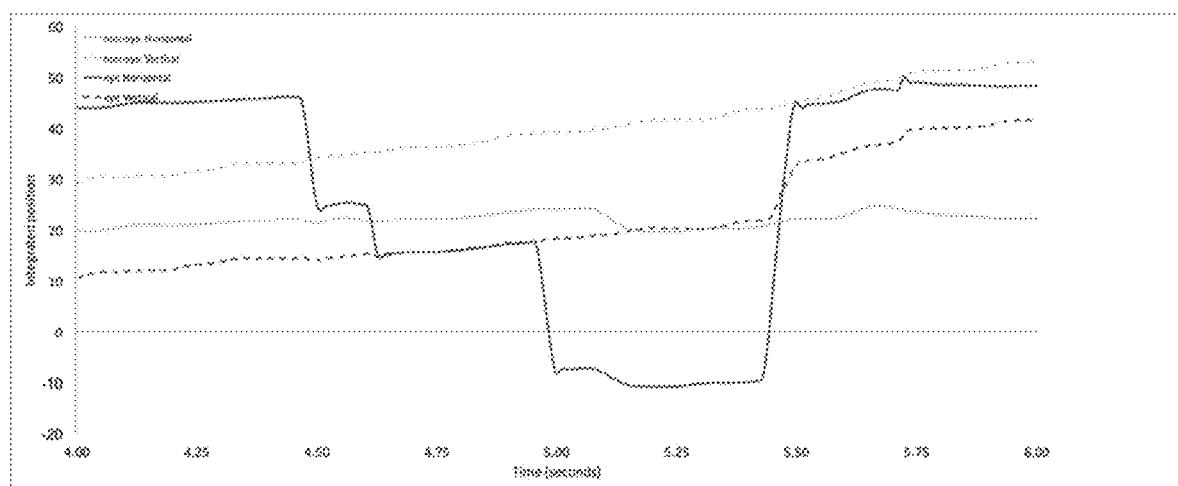
FIG. 10 illustrates the two-dimensional relative position as a function of time for eye and non-eye regions.

FIG. 10 illustrates the two-dimensional relative position of the eye and non-eye regions as a function of time derived from the data illustrated in FIG. 9 by numerical integration. The slow drift between the camera and the non-eye regions (and eye regions) is clearly evident even in this short period, and the signal is virtually free of noise that is typically evident in video-based tracking devices used to monitor eye movements.

Figure 11:
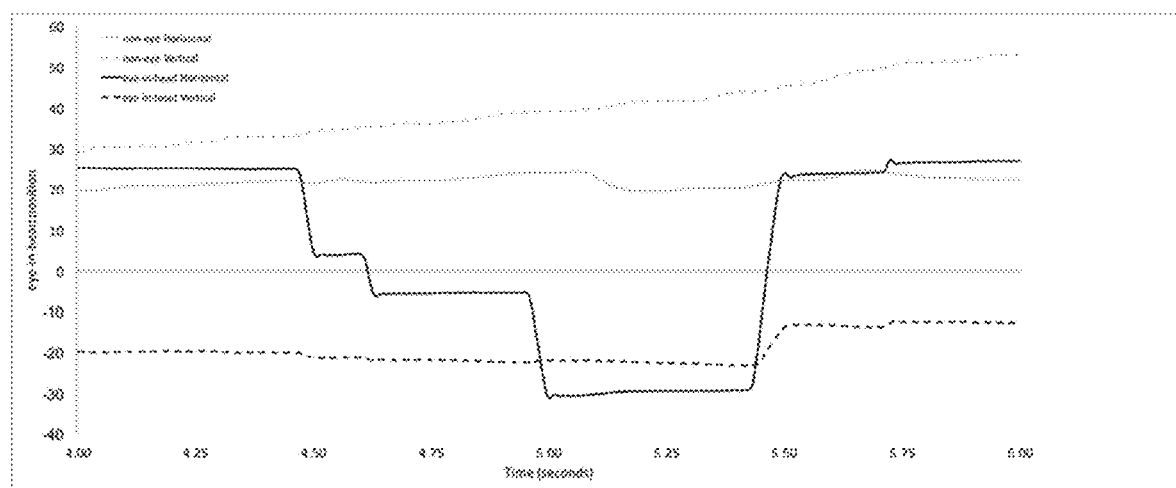
FIG. 11 illustrates the eye-in-head position in black horizontal in solid line, vertical in dashed line along with drift shown in yellow.

FIG. 11 illustrates the result of compensating the velocity of the eye region with the velocity of the non-eye region before numerical integration. The black lines in FIG. 11 represent the position of the eye-in-head, after compensating for the relative motion between the camera and the observer (the solid line indicates horizontal position, the vertical line indicates vertical position). The apparent slow horizontal motion of the eye seen in FIG. 10 at approximately 5.1 seconds is simply an artifact of relative motion between the camera and the observer, as is evident in FIG. 11. The present system is thus virtually immune to high-frequency noise that many other prior systems suffer from, and is also able to compensate for relative motion between camera and observer.

The noise immunity is a function of many characteristics of the disclosure, including, but not limited to, the identification of keypoints in one or more image channels, the robust matching of keypoints across successive images, the determination of a distribution of velocities based on those keypoint matches, extraction of measures from those distributions that reduce or inhibit noise, and the integration of velocity signals. Each of these steps individually enhances the signal quality of the process, and together they provide a signal that is superior to existing unfiltered video processes.

The disclosure as described provides position relative to a reference position based on numerical integration of velocity signals. Absolute position can be obtained by a number of methods including, but not limited to, using the method in parallel with other methods that provide an absolute position signal; periodically returning to a reference position, incorporating a multi-dimensional model of the eye (e.g., a 2D template for a reference position, a 3D model of the eye, or a time-varying 3D model) that can be correlated with the video sequence.

In the instantiation described above, the velocity signals are derived from two or more images. In another instantiation, the velocity signals are derived from a compressed or uncompressed digital video stream or file that has as one or more of its components motion elements (i.e., "motion vectors"). Those motion components can in one instantiation be assigned to eye and non-eye regions using a method based on image, motion, or other features, or in another method the motion components may be used, and the assignments inferred from the distribution of motion components. In one example, provided as an example without limiting other instantiations, a histogram of motion vectors in a video stream can be thresholded at one or more levels, resulting in two or more categories based on velocity, direction, image characteristics, and/or other features that can be assigned to eye(s) and non-eye(s) regions.

The disclosure will be further illustrated with reference to the following specific examples. It is understood that these examples are given by way of illustration and are not meant to limit the disclosure or the claims to follow.

Example 1—Use of Method to Determine Peak Velocity

Because of the system's ability to track eye movements with high precision and with very low noise, it can serve as a high-quality measure of peak saccadic velocity. Because peak saccadic velocity is known to correlate with user attentiveness, drug and alcohol use, and sleepiness. In this example, there is no need to measure position, only velocity, so the velocity signals need not be integrated.

Example 2—Detection and Measurement of Microsaccades

A particular challenge is the detection of very small eye movements, typically those under one degree of visual angle in extent. Noise typically limits the ability to detect such movements, so the method is valuable in detecting such eye movements.

Example 3—Event Detection

In many cases, even when high precision and/or low noise are not required for other reasons in some applications of eyetracking, the need to classify observers' eye movements into categories such as 'fixation,' 'saccade,' 'smooth pursuit,' 'vestibular-ocular response,' etc., benefits from low noise so that event detection algorithms can be applied. Sometimes heavy filtering is applied to the data to limit the noise, but the result is that temporal resolution is degraded, small saccades are lost, slow pursuit is affected, and other metrics are suspect. The application of this method, in place of current methods, or in parallel to other methods would provide a low-noise velocity signal that would allow existing event detection algorithms to be used with high confidence, and would allow new algorithms to be developed.

Example 4—Calculation of Eye-in-Head Position and Projection to 2D Display

In an embodiment, a miniature video camera is placed approximately 25 cm from an observer, and a sequence of images is captured at a rate of 240 frames per second of the region including one eye and the surrounding face, as illustrated in FIG. 1, where three non-temporally adjacent frames are shown for illustration. In this example, the face is illuminated with an LED in the visible spectrum and the miniature video camera is a three-channel, RGB camera.

A monochrome image is computed from each RGB frame by taking the weighted average of each pixel, the weights applied to each of the RGB pixels selected to optimize the contrast of features in the eye and non-eye regions of the resultant monochrome image.

Keypoints are identified in each monochrome frame using descriptors similar to the A-KAZE descriptors [Alcantarilla, P. F., & Solutions, T. (2011). Fast explicit diffusion for accelerated features in nonlinear scale spaces. *IEEE Trans. Patt. Anal. Mach. Intell*, 34(7), 1281-1298.] The keypoints were identified and localized based on the underlying image structure, and are shown in FIG. 2 for two temporally adjacent frames extracted from the digital video sequence. It is evident in FIG. 2 that many of the keypoints are consistently identified and localized across the two frames, as can be seen in the upper-right corner of FIG. 2. It is also evident that there is not a one-to-one correspondence between keypoints in the two images in that region.

Keypoints were matched between the two frames shown in FIG. 2 using a so-called 'brute-force' technique in which the features of every keypoint in the left image in FIG. 2 were compared to the features of every keypoint in the right image in FIG. 2. A goodness-of-fit metric was computed for every pairwise comparison, and two keypoints were determined to be 'paired' if the goodness-of-fit metric was equal or greater than a threshold value of 0.25 and the goodness-of-fit metric of the next-best matching pair was at least a factor of 4.0 lower than the best matching pair, as described in [Lowe, D. G. (2004). Distinctive image features from scale-invariant keypoints. *International journal of computer vision*, 60(2), 91-110.], which is hereby incorporated by reference in its entirety. FIG. 3 shows the keypoints that were matched in this example, where the red lines connect pairs of keypoints that have been matched in this manner. Note that in the upper-right corner of the right image, many but not all of the keypoints are connected to keypoints in the left image. Only those keypoints which had pairs meeting the criteria used in this example are illustrated connected to their paired keypoints with the red lines. Adjusting the goodness-of-fit and matching ratio criteria allow the number of matches to be varied, generally in an inverse relationship with the confidence in the matches. In this example, a compromise has been selected so that a moderate number of matches are identified with a very high confidence, resulting in very few "false matches."

Figure 12:
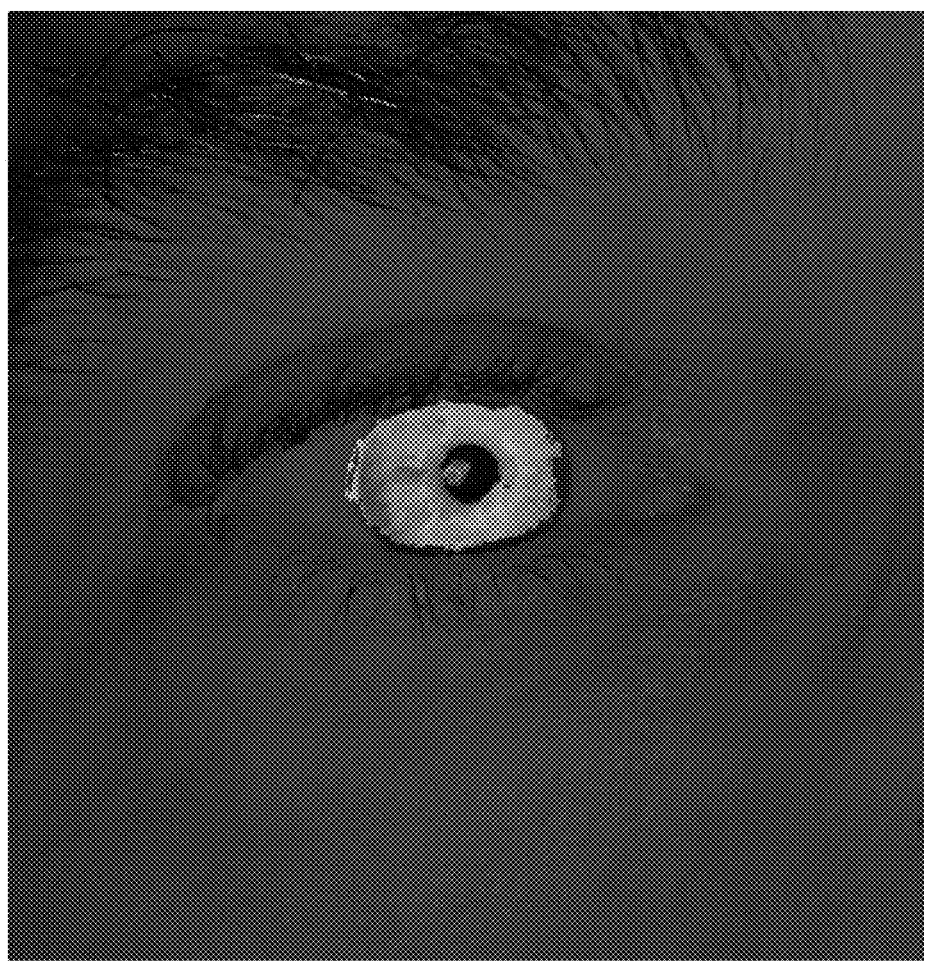
FIG. 12 shows a mask defined in CIE Lab color space to define the iris region.

The RGB image was converted to CIE Lab color space [Schanda, J. (Ed.). (2007). *Colorimetry: understanding the CIE system*. John Wiley & Sons.], and a range of L, a, and b values was selected that represented the approximate bounds of the eye region in Lab color space. FIG. 12 shows a mask created from this color-space volume for one sample frame. FIG. 4 shows the results of applying such a mask to the keypoint matches between temporally adjacent images. The red lines show corresponding pairs of keypoints that were within the CIE Lab color-space bounds in both images. All other keypoint pairs can be considered non-eye pairs, or they may be bounded in some other manner. In this example, they were bounded spatially by selecting a rectangular region below the eye region. FIG. 5 illustrates the corresponding keypoints in the eye regions in red and the corresponding keypoints in the specified non-eye regions in yellow.

Each line in FIG. 5 represents a match computed between temporally adjacent frames in this example. If there is any relative motion between the camera and the surface of the subject being imaged (in the eye or non-eye region), each one of the corresponding keypoint pairs will indicate some non-zero offset between temporally adjacent frames. In the absence of any relative motion between camera and subject, the only offset between keypoint locations in temporally offset images would be due to system noise. In this example, FIG. 6 shows the offset of 503 matches between the non-eye regions in temporally adjacent image pairs. Each offset is shown as a yellow dot in FIG. 6. Because the elapsed time between image capture was 1/240 second (4.167 milliseconds) the offset represents an instantaneous velocity. It is seen in this example that the velocities of the non-eye region (labeled 'Skin' in FIG. 6) are clustered tightly near 0 vertical velocity with a slight negative horizontal velocity.

The velocities of the 81 keypoint pairs identified in the eye regions (shown in red and labeled 'Iris' in FIG. 6), show a clear negative instantaneous horizontal velocity. The wider distribution may be due to some non-rigid distortion of the iris during a rapid horizontal saccadic eye movement.

Model Gaussian distributions were fit to the horizontal and vertical components of the velocity distributions for eye and non-eye regions (labeled 'Skin' and 'Iris' in FIG. 7), and the geometric median of each distribution calculated to lessen the effect of outliers on the measure of central tendency in two dimensions. FIG. 8 shows an example for one pair of images, where the median eye region and non-eye velocities are shown superimposed over the velocity distributions.

The eye and non-eye velocity signals are plotted as a function of time in FIG. 9 over a two-second period. Five rapid eye movements are clearly evident during this period, and two periods of slow movements are visible as well; one at approximately 5.1 seconds and the second at approximately 5.6 seconds.

Figure 13:
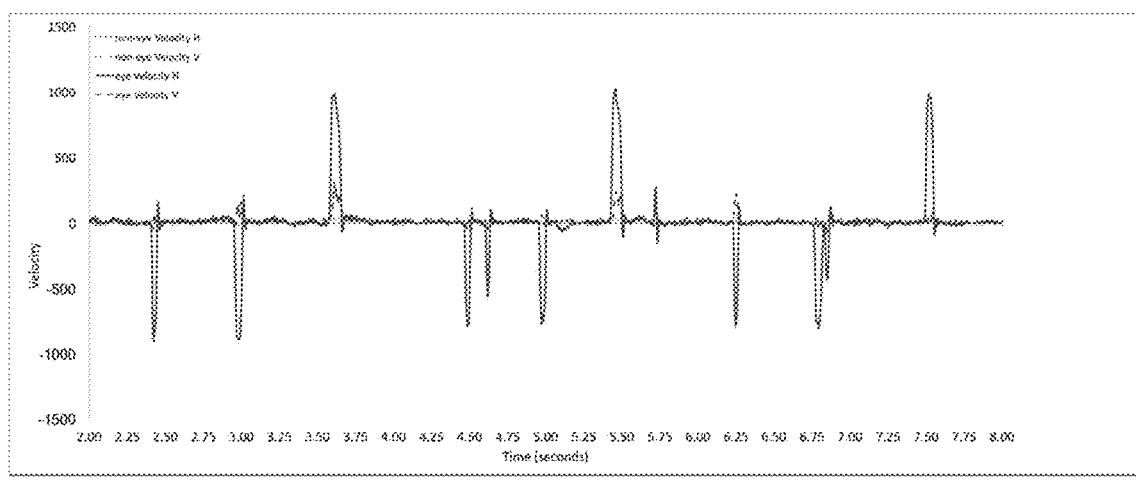
FIG. 13 is a plot of the velocity signals over a six-second time period, wherein horizontal (solid lines) and vertical (dashed lines) velocities for the eye regions (red lines) and non-eye regions (yellow lines) are illustrated.

The eye and non-eye velocity signals are numerically integrated to provide an integrated position signal. In this example, the miniature video camera was known to have a very stable capture frequency, so the numerical integration was a simple summation of velocity signals over time. The result of the numerical integration is shown in FIG. 10 for a two-second interval. A longer (six-second) sequence is shown in FIG. 13 illustrating the clarity with which saccadic events are visible.

Figure 14:
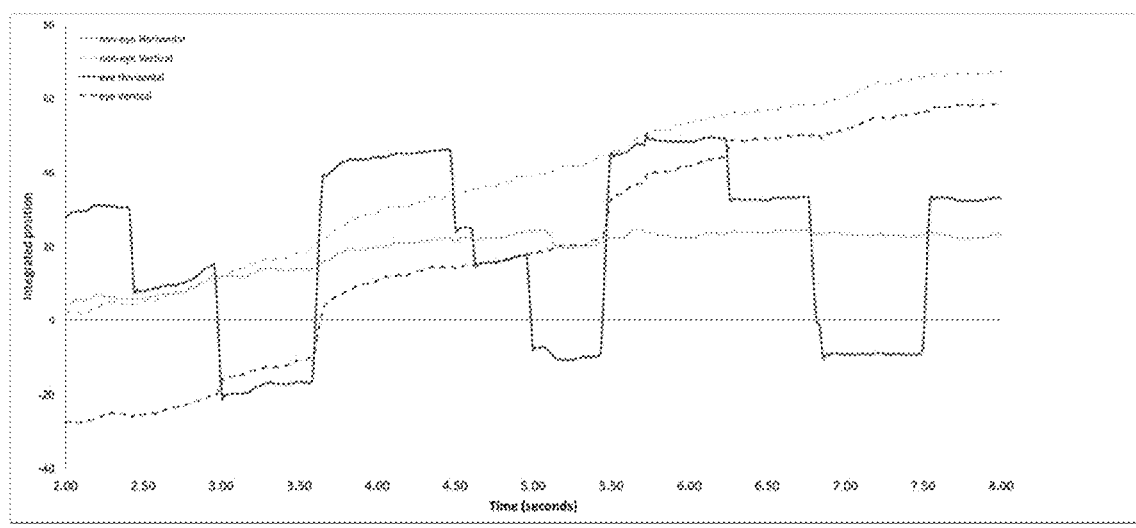
FIG. 14 is a plot showing position over a six-second time period calculated by numerical integration of velocity signals.

It is evident that there is residual motion of the non-eye regions in addition to motion of the eye regions. This is evident in the non-zero slope of the horizontal and vertical integrated position in the two-second trace in FIG. 10 and in the longer six-second trace shown in FIG. 14. It is also evident in FIG. 14 that the motion of the non-eye regions is affecting the apparent motion in the eye regions. For example, the mean shift in vertical eye position evident in FIG. 14 is due to significant eye movements at approximately 3.6 seconds and 5.5 seconds, but the majority of the total shift is due to a consistent, slow drift of the head with respect to the camera, evident in the motion of the non-eye region.

Figure 15:
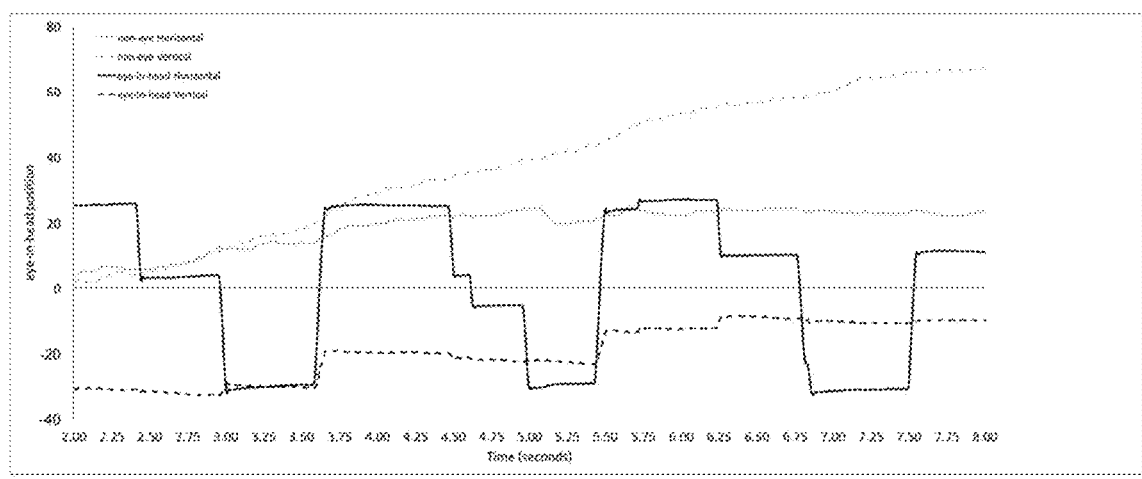
FIG. 15 shows the eye-in-head position as a function of time over a six-second time period, wherein relative motion of the camera with respect to the observer is shown in yellow.

This relative motion between the camera and the observer is compensated for by subtracting the motion of the non-eye-region from the motion of the eye-region. FIG. 11 illustrates the results of this computation in this example for a two-second interval. FIG. 15 shows the unfiltered result over a longer, six-second period. This example shows the clarity and noise immunity of the method.

Although various embodiments have been depicted and described in detail herein, it will be apparent to those skilled in the relevant art that various modifications, additions, substitutions, and the like can be made without departing from the spirit of the disclosure and those are therefore considered to be within the scope of the disclosure as defined in the claims which follow.

What is claimed:

1. A method for monitoring the motion of one or both eyes, comprising:
    capturing over time a sequence of overlapping images of a subject's face comprising at least one eye and the at least one eye corresponding non-eye region;
    identifying a plurality of keypoints in each image of the sequence of images;
    mapping corresponding keypoints in two or more images of the sequence of images;
    assigning the keypoints to the at least one eye and to the at least one eye corresponding non-eye region;
    calculating individual velocities of the corresponding keypoints in the at least one eye and the at least one eye corresponding non-eye region to obtain a distribution of velocities in the at least one eye and the at least one eye corresponding non-eye region;
    extracting at least one velocity measured for the at least one eye and at least one velocity measured for the at least one eye corresponding non-eye region;
    calculating the eye-in-head velocity for the at least one eye based upon the measured velocity for the at least one eye and the measured velocity for the at least one eye corresponding non-eye region subtracting the motion of the at least one eye corresponding non-eye region from the motion of the at least one eye; and
    calculating the eye-in-head position based upon the eye in head velocity.

* * * * *